May 18, 1926.  1,584,994

H. M. ROBERTSON

CAR WHEEL LOCK

Filed June 22, 1925  2 Sheets-Sheet 1

Inventor
Henry M. Robertson
By his Attorneys
Merchant and Kisson

May 18, 1926.
H. M. ROBERTSON
1,584,994
CAR WHEEL LOCK
Filed June 22, 1925    2 Sheets-Sheet 2
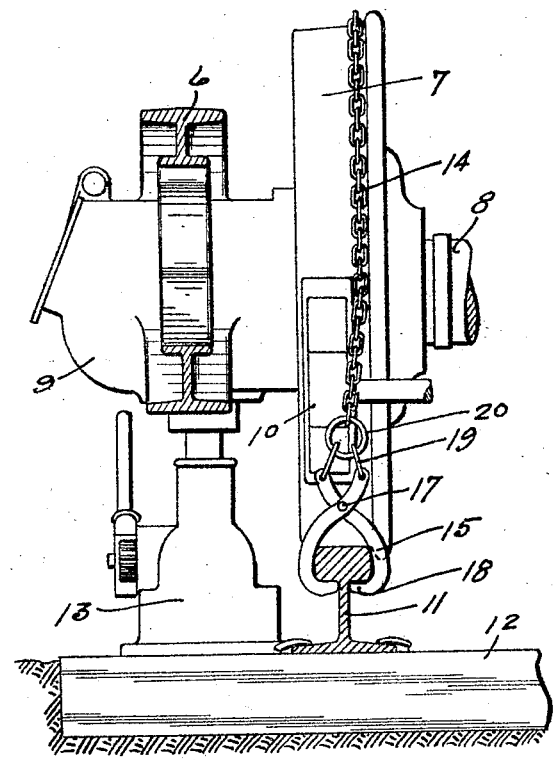
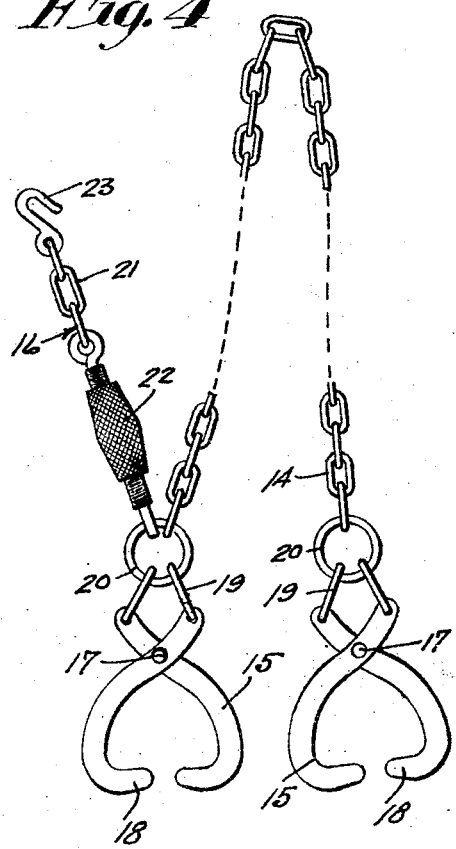
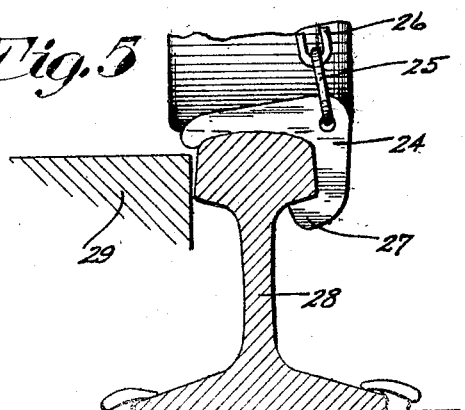
Inventor
Henry M. Robertson
By his Attorneys Patented May 18, 1926.

1,584,994

UNITED STATES PATENT OFFICE.

HENRY M. ROBERTSON, OF ST. PAUL, MINNESOTA.

CAR-WHEEL LOCK.

Application filed June 22, 1925. Serial No. 38,616.

My present invention has for its object to provide an extremely simple and highly efficient car wheel lock for use in holding one of the wheels of a car truck on a track rail while jacking up the journal box for said wheel to permit the removal of its bearing, commonly called a brass, and the substitution of a new one therefor.

To the above end, generally stated, the invention consists of the novel devices and combinations of devices hereinafter described and defined in the claims.

As is well known, when jacking up a journal box for the purpose of removing the bearing for the journal of a car wheel and substituting a new one therefor, said wheel will often lift from the track rail, with the journal box as it is raised by a jack, due to the weight on the journal of the wheel on the opposite side of the car truck and thereby prevent the removal of said bearing and the substitution of a new one therefor. To prevent this lifting of a car wheel from a track rail various different devices used in connection with lifting jacks have been employed. These devices, commonly called wheel dogs, have either been mounted directly on the bodies of jacks, hence requiring special forms of jacks, or they have been mounted on separate bases for jacks. Such wheel dogs must engage a car wheel at a definite place, and hence it is often difficult to find a suitable support such as a railway tie on which to place the jack or a base therefor.

By the use of my improved car wheel lock any suitable form of lifting jack may be used for the reason that said lock is entirely independent of a jack. As it often happens a car wheel will not lift but will remain on the track rail while jacking up its journal box and hence it is not necessary to go to the trouble and take the time to apply means for holding the same. If, however, it is found necessary to hold a wheel, after a jack has been applied under the journal box therefore, my improved car wheel lock can then be applied without removing or changing the position of the jack.

In the accompanying drawings, which illustrate the invention, like characters indicate like parts throughout the several views.

Referring to the drawings:

Fig. 3 is a view partly in elevation and partly in vertical section, taken on the line 3—3 of Fig. 2 and further showing a lifting jack applied under the journal box;

Fig. 4 is a view of the improved wheel lock removed from the track rail and car wheel, on an enlarged scale, with some parts broken away; and Fig. 5 is a detail view showing a modified form of a track rail grapple.

Figure 1:
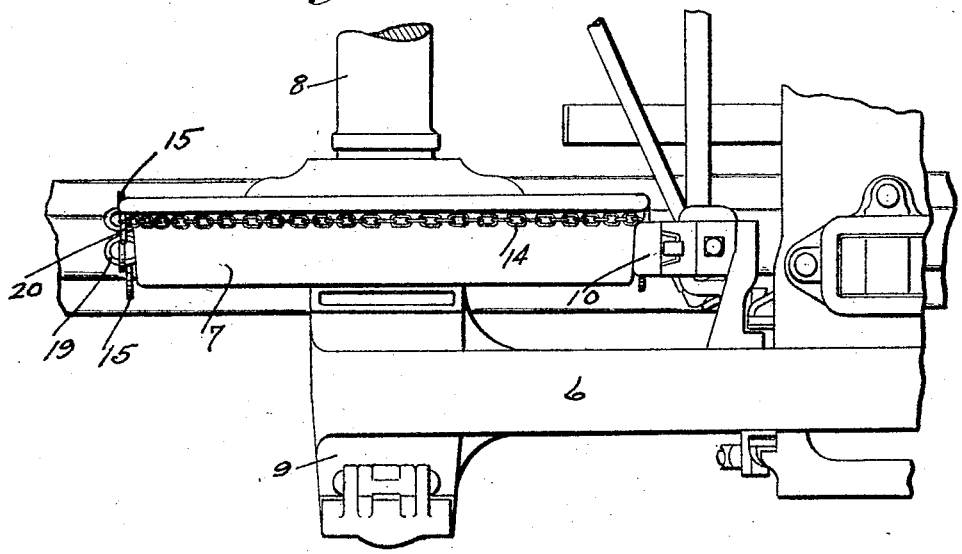
Fig. 1 is a fragmentary plan view of a car truck and track rail with one of the wheels thereof secured to said rail by means of the improved wheel lock.
Figure 2:
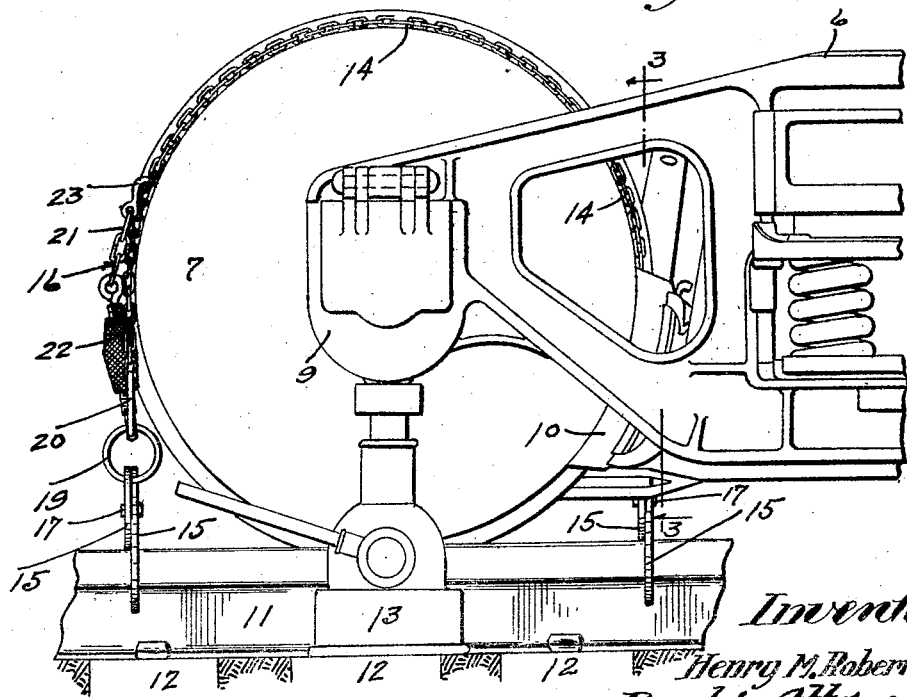
Fig. 2 is a side elevation of the parts shown in Fig. 1.

The numeral 6 indicates a car truck, as an entirety, with the exception of one of its wheels 7 and the axle 8, journal box 9 and brake shoe 10 for said wheel. The wheel 7 is supported on a track rail 11 spiked to ties 12. A lifting jack 13 is applied under the journal box 9 and supported on one of the ties 12 in position to raise said journal box. The parts thus far described have been illustrated simply for the purpose of showing the car wheel lock applied in working position and may take various different forms.

The improved car wheel lock comprises a link chain 14 having at each end a track rail grapple 15 and also having a take-up section 16. Each track rail grapple 15 comprises a pair of crossed legs intermediately connected by a pivot 17 and having hook-like ends 18. A pair of track rings 19 is secured in the short ends of the legs of the rail grapples 15 and which rings are connected by a single ring 20 to which one of the ends of the chain 14 is secured. The take-up section 16 includes a short chain 21 having at one of its ends a turn buckle 22 attached to one of the rings 20 and at its other end a hook 23. This hook 23 is adapted to be interlocked with any one of the links of the chain 14 for taking up a portion thereof to vary its operative length. The only purpose of connecting the chain 14 to the ring 20 to which the turn buckle 22 is attached is to keep the several parts of the car wheel lock together. The track rail grapples 15 are adapted to be applied transversely over the head of the track rail 11 with their hook-like ends 18 engaging the under surface of said head on each side of the web of said rail.

To apply the car wheel lock to the car wheel 7 and track rail 11 to prevent said wheel from lifting at the time the journal box 9 is raised by the jack 13, the chain 14 is passed circumferentially over said wheel close to its flange and with one end portion thereof, towit: the one without the take-up device 16, hanging between said flange and the brake shoe 10. The grapples 15 are then attached to the track rail 11 and the hook 23 secured in one of the links of the chain 14 to take up substantially the greater part of the slack therein. Then by manipulating the rotatable member of the turn buckle 22, the chain 14 may be drawn tightly circumferentially over the wheel 7 with the hook-like ends 18 of the grapples 15 engaging the under surface of the head of the rail 11. With the car wheel lock thus applied, the wheel 7 will be securely held on the track rail 11 and prevented from lifting during the operation of the jack 13 to lift the journal box 9 and thereby permit the bearing for the journal of the car wheel 7 to be removed and a new one substituted therefor.

At the completion of the changing of the bearing for the car wheel 7, the journal box 9 may be lowered by the jack 13 and the car wheel lock very quickly and easily removed from the car wheel 7 and track rail 11 simply by operating the turn buckle 22 sufficiently to release the hook 23 and thereby permit the same to be detached from the chain 14, or to permit the grapples to be detached from the track rail 11.

From the above description, it is evident that the improved car wheel lock may be used in connection with any kind of a jack and can be very quickly applied to a car wheel and track rail or removed therefrom. Said car wheel lock may be adjusted to fit car wheels and track rails of various different sizes. When not in use, the car wheel lock can be stored in a securely compact form. By the use of my improved car wheel lock a car wheel is locked to a track rail and is independent of a lifting jack, and hence all danger of the car wheel being released in case the lifting jack settles or slips is eliminated.

Referring now to the modification of the track rail grapple shown in Fig. 5, the same is in the form of a vertically disposed bell crank 24 to the elbow of which is attached a ring 25 to which a chain 26 similar to the chain 14 is attached. This grapple 24 is adapted to be placed transversely of the track rail 28 with its horizontal arm bearing on the head of said rail and its vertical arm engaging the inner face thereof and provided at its free end with a hook 27 arranged to engage the under surface of the head of said rail and thereby lock the grapple thereto. The track rail grapples 15 and 24 can be applied to rails of different sizes and the grapple 24 is especially designed for securing the car wheel lock to a track rail at the outer side of which is a platform or other surface 29 which is substantially flush with the top of the head of said rail.

The word "chain" is herein used in a broad sense to cover any form of cable, and in place of applying the car wheel lock circumferentially over the periphery of the wheel 7, the same may be applied over any part of the wheel structure such as the axle 8.

What I claim is:

1. A car wheel lock comprising a chain adapted to be applied circumferentially over a wheel structure and having at each end a track rail grapple, a take-up section for said chain having one of its ends secured to one of said grapples and having at its other end a hook adapted to be interlocked with the different links of the chain to vary the operative length thereof.

2. The structure defined in claim 1 in further combination with a turnbuckle interposed in the take-up section for the chain.

In testimony whereof I affix my signature.

HENRY M. ROBERTSON.